May 6, 1969   A. G. HAMMITT   3,443,129
VAPOR-LIQUID CYCLE MHD POWER CONVERSION

Filed March 17, 1966   Sheet 1 of 3

Andrew G. Hammitt,
INVENTOR.
BY
Joseph R. Dwyer
Attorney

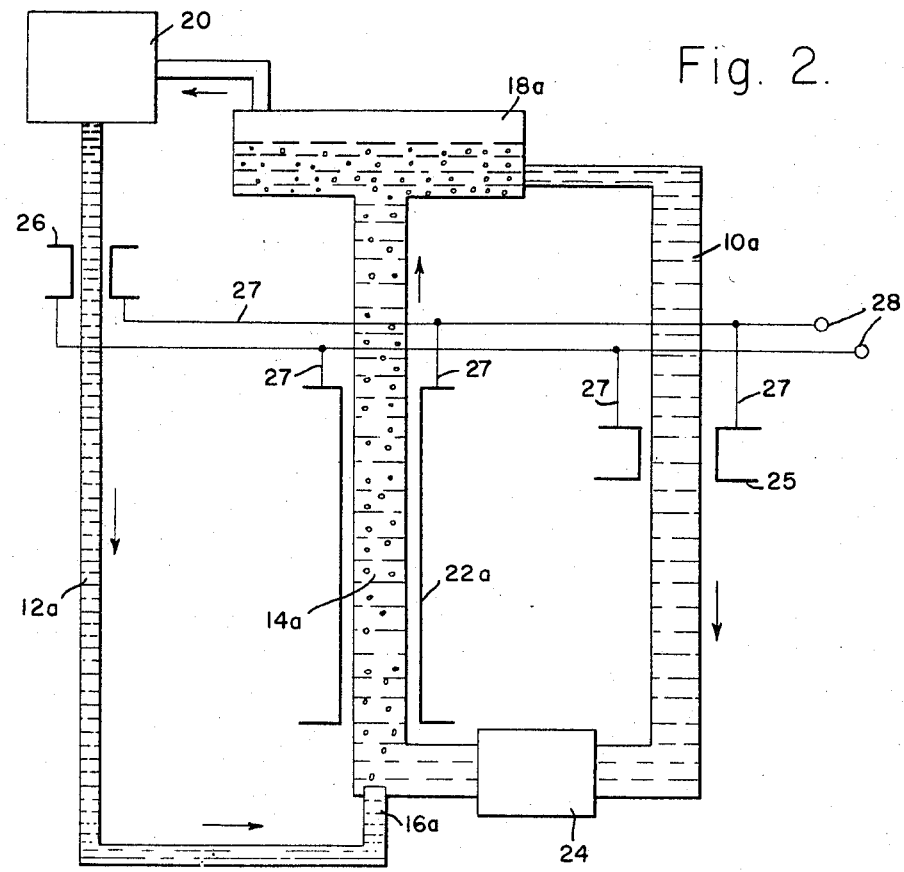
Fig. 2.
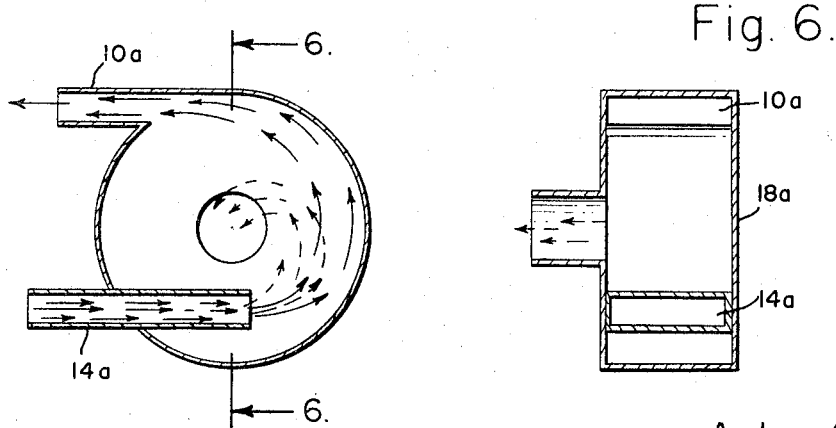
Fig. 5.
Fig. 6.
Andrew G. Hammitt,
INVENTOR.

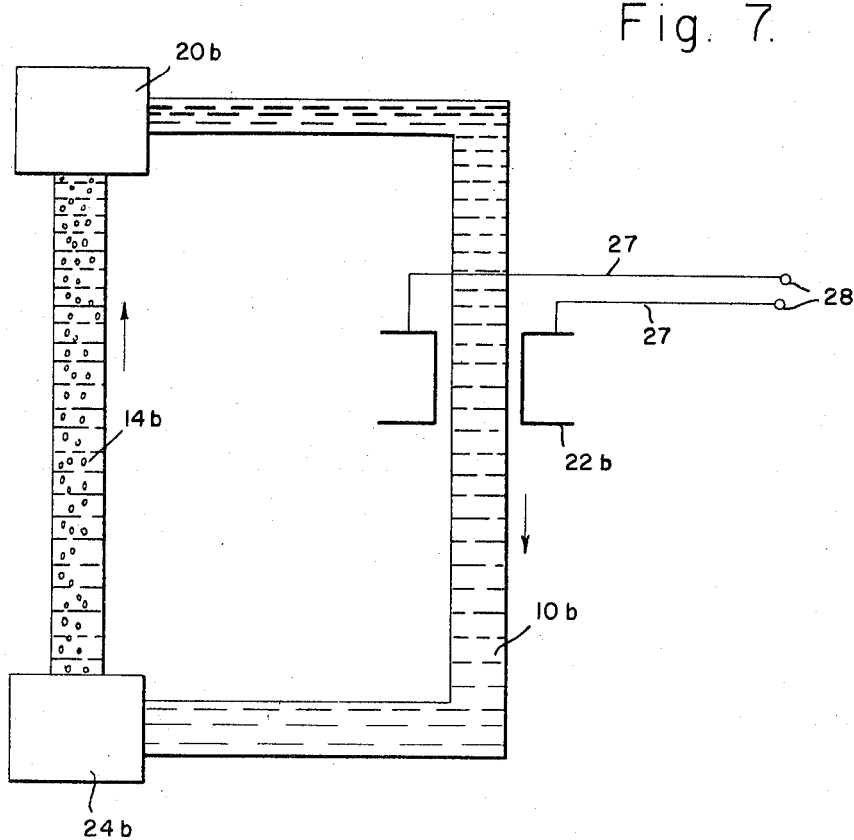

United States Patent Office 3,443,129
Patented May 6, 1969

3,443,129
VAPOR-LIQUID CYCLE MHD POWER CONVERSION
Andrew G. Hammitt, Spring Lake, N.J., assignor to TRW Inc., Redondo Beach, Calif., a corporation of Ohio
Filed Mar. 17, 1966, Ser. No. 535,380
Int. Cl. H02k *45/00;* G21d *7/02*
U.S. Cl. 310—11                                        4 Claims

ABSTRACT OF THE DISCLOSURE

The working fluid of the MHD is a conductive liquid propelled by a vapor portion of the liquid or the vapor of a second liquid.

---

This invention relates to magnetohydrodynamic (MHD) systems for thermal electric power conversion and it is a general object of this invention to provide an MHD thermal electric power conversion system by the use of fluids at low fluid velocities and without mechanical moving parts.

It is recognized that MHD systems utilizing fluids for thermal electric power conversion have been proposed. The most common proposed system includes a jet mixing system in which one fluid is driven by another by a jet mixing momentum exchange system with the driven fluid directed through an MHD generator to generate electrical energy. Such a system, for example, will utilize a liquid mercury loop driven by a mercury vapor jet. This system has disadvantages for MHD power conversion because of its inefficiency due to mixing losses. By way of explanation, in such a system because the liquid loop must be kept at low velocities to keep the friction reasonably low, and the velocity of the vapor jet must be kept high to provide a reasonable thermodynamic cycle with a relatively high energy release per unit mass of fluid, the mixing losses are high and low efficiency will result.

Another known system utilizing two fluids embodies a loop of driven liquid medium and a loop of driving vapor medium; the latter for imparting high velocity to the driven liquid. In this system, the driven liquid is heated and mixed with the condensed vapor medium at a temperature which will vaporize the condensate. This mixture is then expanded through a nozzle in which high velocity is imparted to the liquid. Thereafter, the driven liquid and vapor are separated while still at high velocity and the high velocity driven liquid is directed through an MHD generator to generate electrical energy. At the same time, the separated vapor medium is condensed and returned to a point where it will be mixed again with the heated driven liquid to begin the cycle again.

This latter system, while having no moving parts, is quite complex and has many inherent problems because of the velocity of the fluid at which the system operates. For example, such a system requires special equipment to separate the vapor from the high velocity driven liquid medium; there are also high losses involved in such a separation, and the friction losses of the high velocity liquid are high.

The present invention simplifies MHD electric power generator conversion systems and thus overcomes the problems of the above-known systems. The system which comprises this invention energizes a loop of driving vapor medium, sometimes called the thermodynamic fluid, and a loop of driven liquid medium, sometimes called the conductive liquid, which are mixed at one end of a leg or tube common between the two loops. Two separate substances may be used for one substance for both purposes. At the mixing end of the tube, or mixer as it is sometimes called, the thermodynamic fluid is either in condensed or gaseous form and the conductive liquid is at a temperature high enough so that, when mixed, thermodynamic fluid forms bubbles, which expand and move through the common tube to the other end of the tube to a separator where the vapor is then separated from the liquid. These bubbles form a simple means for coupling the thermodynamic fluid and the conductive liquid medium and serve to pump or drive the conductive liquid against a force field by dragging the liquid along by viscous forces. As the liquid returns to the mixer, as aforesaid, the conducting liquid is driven by this force field through the magnetic field of the MHD generator to generate the electrical energy. At the same time, the vapor separated from the liquid in the separator end is passed through a condenser to form a condensate which is returned by this force field to the mixer.

In one embodiment of this invention a gravity force field is used as the force field referred to above. The common tube, sometimes called a bubble tube, is disposed vertically so that the fluids in the mixer, being lower than the separator, are at a higher pressure due to the gravity head in the loop than the liquid and vapor at the higher separator. In this manner, the bubbles pump the liquid against the gravity in the bubble tube to a higher level thus increasing the liquid's potential energy which is then expended by allowing the liquid to return to the mixer through the MHD generator by the force of gravity.

It can be appreciated that using the expansion of the bubbles against gravity is highly efficient and that the system is kept simple by the utilization of the gravity force to obtain an expansion and compression cycle of the vapor medium and the liquid medium. The selection of the fluids may be chosen to allow a suitable thermodynamic cycle in conjunction with the pressure limitations imposed by the strength of the gravity field. Thus, dependent upon the mediums selected for the pressure and temperature ranges desired, this system may be used in a number of applications, such as simple unattended small sized power plants or, for example, in central power stations where the simplicity of the system allows higher temperatures to be obtained than may be obtained in more complicated systems having mechanical moving parts.

In space requirements where there may be insufficient gravity force to provide the force field or whenever this gravity force field is inadequate another embodiment may be utilized. In the second disclosed embodiment an MHD force field is used. A high pressure zone at the mixing end of the bubble tube and a low pressure zone at the separation end of the bubble tube may be created by providing two MHD pumps in the liquid loops which pump the liquid from the separator toward the mixer and an MHD generator in the leg which expands the mixture from this mixer to the separator. The MHD pumps are driven by a portion of the electrical energy converted by the MHD generator, which in this embodiment, is located between the mixer and the separator so as to be driven by the bubbling vapor-conductive liquid mixture. It is contemplated also that in certain use applications of this second disclosed embodiment a cyclonic separator would be utilized.

Another version of either of the embodiments of this invention contemplates the use of a plurality of fine or smaller tubes incorporated in the bubble tube so that the tube is broken up into fine passages and the flow therethrough comprises slugs of liquid separated by bubbles. This version would utilize the pumping ability of the bubbles by percolation more efficiently, and if desired, could form a type of pulsating D.C. current, where the application of such current would be desirable. In order to extract the electrical energy form the pulsating flow to obtain the D.C. current, the MHD generator is positioned between the mixer and the separator where the vapor and liquid are still separated in slug form within the fine tubes.

From the foregoing, it can be seen that this invention has for its objects the provision of a complete MHD cycle power conversion which is very efficient, is simple, and has a number of uses. It should be borne in mind, also, that while the foregoing versions describe two fluids in the sense of different substances, it is within the scope of this invention to use one substance for the two fluids—one in the liquid stage and the other in the vapor stage—as will be clear from a more detailed description hereinafter and additional objects will become apparent to those skilled in the art after having studied the following detailed specification and accompanying drawings which form a part thereof and wherein:

FIG. 2 is a block diagram showing a two-fluid system constructed in accordance with the teachings of this invention and utilizable in a nongravity field.

FIGS. 5 and 6 are schematic illustrations of a typical cyclonic separator for use in this invention; and FIG. 7 is a schematic illustration of single substance systems constructed in accordance with this invention in which the driving medium is vapor bubbles formed in the conductive or lower driven liquid.

Figure 1:
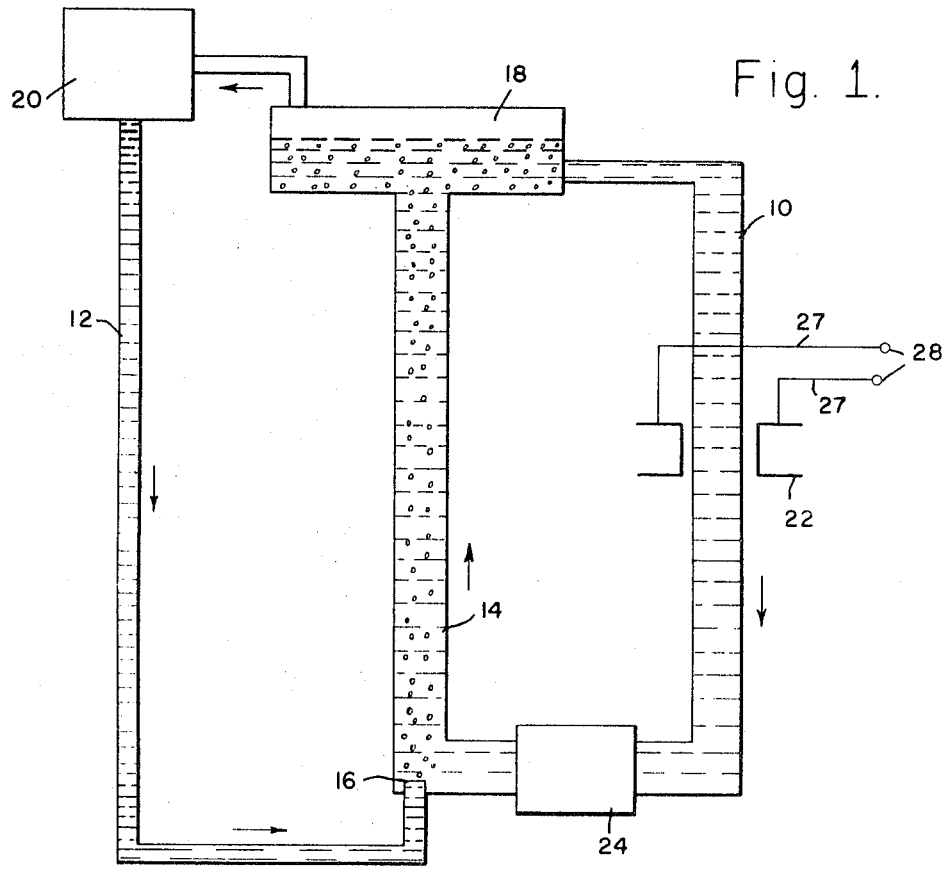
FIG. 1 is a block diagram showing a two-fluid system constructed in accordance with the teachings of this invention and utilizable in the gravity field.

Turning now first to FIG. 1, the two-fluid MHD system for thermal electric power conversion herein illustrated involves a conductive liquid loop 10 through which conductive liquid medium, such as a metal in a liquid state, circulates and a loop 12 through which a vapor-liquid thermodynamic medium circulates. Loops 10 and 12 share a common leg or bubble tube 14 which has a mixer 16 at the lower end of the tube 14 where the liquid metal and the thermodynamic fluid are mixed. The other or higher end of the tube 14 terminates in a separator 18 where the vaporized thermodynamic fluid is separated from the liquid metal. The thermodynamic vapor passes through a condenser 20 where the vapor is condensed back to a liquid to return to the mixes 16. The liquid metal on leaving the separator 18 passes through an MHD generator 22 of conventional design which generates electrical energy from the moving conductive liquid. The moving conductive liquid then passes through a heater 24 to elevate the temperature of the liquid prior to return to the mixer 16. While the heater 24 is shown in the liquid loop 10, it may be incorporated in the thermodynamic loop 12.

In this figure, which is a schematic illustration of one embodiment of this invention, the mixer 16 is lower than the separator 18, so that the liquid in the mixer is under pressure due to a force field which in this case is the gravity force on the liquids and the bubbles formed by mixing the condensed thermodynamic fluid with the heated conductive liquid form travel toward the lesser pressure area in the separator 18. The movement of these bubbles towards this zone of lower pressure in the separator carry along the liquid causing movement thereof in the tube against the gravity head toward the separator. The gravity force causes movement of the conductive liquid metal from the separator through the magnetic field to generate electricity in the well known manner.

From the above, it can be seen that the use of the expansion of the bubbles to pump the conductive liquid against gravity and the return of the liquids by gravity provides an efficient and simple MHD power conversion system.

In the operation of this system, the work obtained from the system per unit mass of conducting fluid may be shown to be approximately $$\Delta\rho |V_{\text{B.M.}} - V_{\text{C.F.}}|$$

where $\Delta\rho$ is difference in pressure between top and bottom of the bubble tube $V_{\text{B.M.}}$ = average specific volume of the bubble mixture
$V_{\text{C.F.}}$ = specific volume of the conducting fluid.

An amount of $\Delta\rho$ equal to this fraction of the total $\Delta\rho$ can thus be removed in the MHD generator and the remaining $\Delta\rho$ is enough to return and recirculate the conducting fluid.

Since specific volume is important in the operation of this system, the fluid must be chosen which will allow a suitable thermodynamic cycle in conjunction with the pressure limitations imposed by the strength of the gravity field. Also the conducting liquid must also have low vapor pressure, have a high electrical conductivity, be heavy to minimize flow but chemically inert with the thermodynamic liquid. For example, for small power plants a system using low condensing temperature is most appropriate. A mercury and water combination is suggested except that for the pressure differences imposed by gravity force for a reasonable size the $\Delta\rho$ would be too small for large temperature difference between mixer and condenser. Another combination could be mercury and diffusion pump oil which would give a more reasonable $\Delta\rho$ for a reasonable temperature difference.

For central stations where high temperature is required, lead or bismuth, for example, could be used with a variety of thermodynamic fluids which have suitable vapor pressures at temperatures ranging between 2000° R. to 1400° R.

Turning now to the second embodiment of this invention which is useful where the gravity head may not be adequate the liquid loop 10a and 12a are subjected to MHD pumps 25 and 26 which serve to drive the conductive liquid and condensate toward the mixer 16a. In this embodiment an MHD generator 22a is located between the mixer 16a and the separator 18a to generate electricity from the conductive liquid moving in the bubble tube. The generator 22a imposes a force field on the mixture in the bubble tubes 14a which force field functions to replace the gravity force field of the first embodiment. A portion of the electricity generated by this generator 22a is directed to the MHD pumps 25 and 26 as shown by the connecting lines 27, while the remainder is directed to the output terminals indicated as 28.

The operation of this system, except for the creation of the low and high pressure zones by the MHD pumps 25 and 26 and generator 22a, is the same as that described in connection with the previous embodiment and consequently those elements of this second embodiment having the same function and operation have been given the same reference numerals, except for the suffix a.

Figure 3:
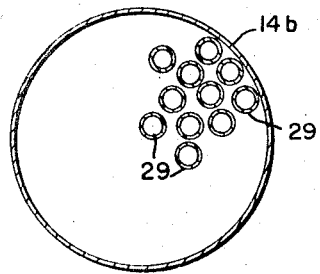
FIG. 3 is an enlarged cross-sectional view of the bubble tube utilizing fine tubes to form slugs of vapor and liquid.
Figure 4:
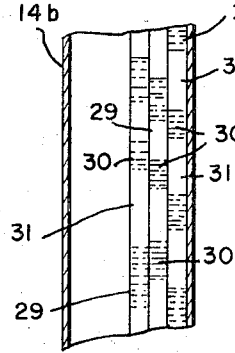
FIG. 4 is an enlarged elevational semi-schematic view of the bubble tube utilizing fine tubes.

In some applications it may be desirable to percolate the fluid through a plurality of fine tubes of small diameter located in the mixing tube 14b as illustrated schematically in FIGS. 3 and 4 as 29. Such a system would insure a distribution of the bubbles and a more positive conveyance of the conductive liquid toward the separator since the bubbles would divide the liquid metal into slugs separated by bubbles of vapor, as illustrated at 30 and 31 in FIG. 4. As previously mentioned, it may also be desirable to utilize this embodiment of the invention to derive pulsating D.C. current in the MHD generator in which case the MHD generator would be located operatively in connection with the bubble tube, such as in a position as shown in FIG. 2 rather than where the MHD generator is located in FIG. 1.

FIGS. 5 and 6 illustrate a cyclonic separator of design suitable to zero gravity operation suitably connected into the system, such as shown in FIG. 2 in lieu of the separator 18a, as shown therein. This cyclonic separator would separate the liquid and the vapor by centrifugal effect and would be required where gravity is not available to use to operate the separation system such as illustrated in FIG. 2.

Since the connection of the cyclonic separator is located in the drawings with appropriate reference numerals illustrating the legs of the loops, no further description is needed herein.

As previously mentioned, while the foregoing discussed the inventive concept in connection with a two-fluid system in which the driving and driven mediums were different substances, the driven medium can be of the same substance except in the vapor stage. FIG. 7 illustrates an apparatus for producing electrical energy in which the means for applying thermal energy 24b is located so as to form bubbles at the zone of higher pressure of leg 14b with a condenser 20b located at the opposite end of leg 14b, so that the bubbles will drive the liquid from one end of the leg to the other. When condensed in condenser 20b, the driven liquid continues on to flow through leg 10b to generate electricity in MHD generator 22b.

It can be appreciated that the operation of the apparatus shown in FIG. 7 is comparable to the devices previously described in FIGS. 1-6 and for that reason the same reference numbers were used to identify components having the same function and operation (except for the suffix b) and while FIG. 7 illustrates a gravity system, the apparatus can be used in a nongravity environment by the use of an MHD pump used in a manner described in the previous figures.

From the foregoing it can be seen that the advantages of this invention lie in the fact that the velocity of the fluids operating in the system is not within any particular range; that the problems of separation of gas and liquid at high velocity have been eliminated; conversion of thermal energy to potential energy rather than kinetic energy before conversion to electricity simplifies the present system; that the friction losses attendant in high velocity liquid systems have been eliminated; and that the number of parts necessary to operate a system at high velocity have been obviously reduced. While two embodiments of the invention have been disclosed, it will be appreciated that many modifications and equivalents may be made as will be apparent to anyone skilled in the art once having understood the foregoing, and that such modification and equivalents come within the purview of the appended claims.

The embodiments of the invention in which an exclusive property or privilege is claimed are defined as follows:

1. An apparatus for producing electrical energy comprising:
   an electrically conductive liquid medium;
   a propelling medium comprising vapor;
   means for mixing said mediums whereby said vapor travels through said liquid medium against a force field and moves the liquid medium of said mixture therewith;
   means for establishing a magnetic field in the region of said conductive medium to produce electrical energy;
   means for separating said mediums;
   means for defining a flow path for each of said mediums from said separating means to said mixing means;
   means for condensing the propelling medium before the medium is mixed with said conductive means;
   a first closed system for circulating a conductive liquid medium;
   a second closed system for circulating the propelling medium, said circulating systems having a common conduit for mixing said mediums;
   thermal energy supplying means for vaporizing said propelling medium at one end of said common conduits;
   separator means being located at the other end of said common conduit for returning said mediums to their respective systems, said vaporized propelling medium carrying said conductive liquid medium along as it flows toward said separator;
   means for creating a zone of high pressure, said means being formed by having said separator higher than said one end of said common conduit so that said mediums flow against gravity toward said separator to return to said one end by gravity.

2. An apparatus for producing electrical energy comprising:
   an electrically conductive medium;
   a propelling medium comprising vapor;
   means for mixing said mediums whereby said vapor travels through said liquid medium against a force field and moves the liquid medium of said mixture therewith;
   means for establishing a magnetic field in the region of said conductive medium to produce electrical energy;
   means for separating said mediums;
   means for defining a flow path for each of said mediums from said separating means to said mixing means;
   means for condensing the propelling medium before the medium is mixed with said conductive means;
   a first closed system for circulating a conductive liquid medium;
   a second closed system for circulating the propelling medium, said circulating systems have a common conduit for mixing said mediums, said second closed system having a second loop containing a second liquid medium;
   each loop having one leg in common and wherein the second liquid medium and the conductive liquids are moved together at one of said leg and supplied at the other; and
   means for supplying thermal energy, said means being located in one of said loops for raising the temperature of one of said mediums to vaporize said second medium when said mediums are mixed so that vapor will flow through said leg to said separator carrying along therewith said conductive liquid medium against a force field.

3. The apparatus claimed in claim 2 wherein said force field is gravity.

4. The apparatus claimed in claim 2 wherein said force field is magnetic.

References Cited

UNITED STATES PATENTS

| | | | |
|---|---|---|---|
| 3,294,989 | 12/1966 | Eichenberger | 310—11 |
| 3,320,444 | 5/1967 | Prem | 310—11 |

DAVID X. SLINEY, *Primary Examiner.*